3,412,130
QUATERNARY AMMONIUM DYESTUFFS OF O-NITRO-PHENYL SUBSTITUTED DILOWER ALKYLENE TRIAMINES
Gustav Schafer, Frankfurt am Main, Johann Ostermeier, Offenbach (Main), and Norbert Ottawa, Frankfurt am Main, Germany, assignors to Farbwerke Hoechst Aktiengesellschaft vormals Meister Lucius & Bruning, Frankfurt am Main, Germany, a corporation of Germany.
No Drawing. Filed Oct. 21, 1966, Ser. No. 588,283
Claims priority, application Germany, Aug. 27, 1966, F 50,058
4 Claims. (Cl. 260—459)

ABSTRACT OF THE DISCLOSURE

Water-soluble N-(lower alkyl) quaternary dyestuffs of the formula

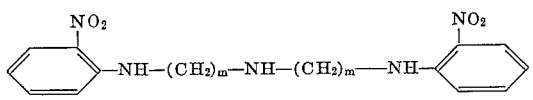

having as an anion a halide⁻, an $-SO_4^{--}/2$, a lower alkyl—O—$SO_3^-$ or a $CH_3COO^-$ group and wherein $m$ represents an integer of 2 to 6, which dyestuffs are highly suitable for dyeing and printing fibrous materials of polyacrylonitrile.

---

The present invention provides new, easily water-soluble cationic dyestuffs and a process for preparing them; especially, it provides water-soluble quaternary compounds of basic dyestuffs of the general formula

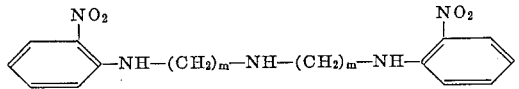

in which $m$ represents an integer from 2 to 6. We have found that new, easily water-soluble cationic dyestuffs can be prepared by reacting 1 mol of a triamine of the general Formula 1

$$H_2N-(CH_2)_m-NH-(CH_2)_m-NH_2 \quad (1)$$

wherein $m$ represents an integer from 2 to 6, with at least 2 mols of a compound of the general Formula 2

in which X represents a chlorine or bromine atom, in an aqueous, aqueous-organic or organic medium in the presence of acid-binding agents, and by quaternizing partially or completely the basic dyestuff thus obtained of the Formula 3,

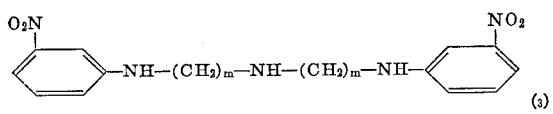

by treating it with suitable alkyl, aralkyl or aryl compounds.

The reaction of the triamine of the above-mentioned general Formula 1 with the nitro benzene derivative can be carried out, for example, in an alkanol containing from 1 to about 10 carbon atoms, in xylene, dimethyl formamide, ethylene glycol, diethylene glycol, diethylene glycol monoethyl ether, dioxane or tetrahydrofurane as organic medium.

The condensation mentioned above is carried out in the presence of acid-binding agents, such as, alkali metal hydroxides, alkali metal carbonates, alkali metal hydrogen carbonates, tertiary organic bases, such as pyridine, picoline or dimethyl formamide. The condensation is carried out at temperatures between about 20° C. and about 150° C., preferably, between about 80° C. and about 120° C. The optimal temperature to be used in each individual case is to be adjusted according to the reaction components and the reaction medium used. The reaction can also be carried out, above or below the foregoing temperature range; in case of operating at lower temperature, however, correspondingly longer reaction periods are necessary. The molar ratio of the two reaction components during the condensation is normally 2:1, but the nitro benzene derivative of the general Formula 2 can also be used in an excess, for example, in a 2.1 to tri-molar excess.

The treatment of the primarily obtained basic dyestuffs of the general Formula 3 with alkyl halides, dialkyl sulfates, or carboxylic acid aryl esters, preferably, with alkyl bromides and alkyl iodides containing from 1 to 4 carbon atoms or with dialkyl sulfates containing from 1 to 2 carbon atoms as quaternizing agents, is carried out in such a way that the isolated basic dyestuff or its salt of an inorganic or organic acid is suspended in water or in an aqueous-organic medium, for example, in an aqueous alkanol containing from 1 to about 5 carbon atoms; then, the suspension is combined, at first at temperatures between about 30° C. and about 90° C., preferably, between about 50° C. and about 70° C., with an excess of quaternizing agent, for example, up to a 10-molar excess, and with such an amount of acid-binding agent that a pH value of about 7 to 9 is maintained. Thereupon, the whole is heated to temperatures between about 60° C. and 100° C. while maintaining the pH value of between about 7 and 8, until the dyestuff is easily soluble in 5% acetic acid. As acid-binding agents may be used the agents mentioned above as being suitable for the condensation. By choosing the quantity of the quaternizing agent used, calculated on the basic dyestuff, the duration of the reaction and the temperature, the quaternization can be controlled with regard to partial or complete quaternization.

The dyestuffs obtained according to the process of the present invention possess excellent water-solubility and on polyacrylonitrile fibre materials they produce greenish to reddish-yellow dyeings or prints of a good fastness to light and a good fastness to wet processing, for example, of a good fastness to washing, rubbing and perspiration. In view of their high water-solubility they are especially suitable for the dyeing of the fibrous materials mentioned above.

The following examples serve to illustrate the invention, but they are not intended to limit it thereto, the parts being by weight unless otherwise stated.

EXAMPLE 1

65.5 parts of dipropylene triamine are added dropwise while stirring at 80° C. to a solution of 157.5 parts of o-chloro-nitro-benzene in 50 parts of n-butanol. The solution is heated to 130° C. to 135° C. and this temperature is maintained for about 1 hour. Subsequently, 42 parts of sodium bicarbonate are added and stirring is continued for a further 10 hours at this temperature. After addition of about 250 parts of ethanol and 50 parts of hydrochloric acid the whole is cooled and the crystal mass is filtered with suction and washed with ethanol. 75 parts of the hydrochloride of the basic dyestuff of the formula

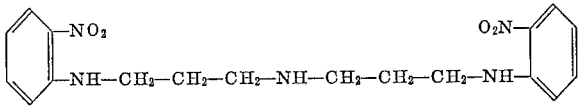

thus obtained are suspended in 100 parts of water. Thereupon, 100 parts of diethyl sulfate and dilute aqueous sodium hydroxide solution are added while stirring at 60° C., so that a pH value of about 8 is maintained. Subsequently, the whole is heated to 90° C. while maintaining a pH range from 7 to 7.5, until a sample is easily soluble in 5% acetic acid. After cooling, the crystal mass formed is filtered with suction, dissolved while hot in 10% acetic acid and clarified while hot after addition of charcoal. After cooling, the precipitated dyestuff is filtered with suction and washed with 10% aqueous sodium chloride solution.

After drying, the cationic dyestuff is obtained, whose cation is the quaternized (ethylated) compound of the base mentioned above. The dyestuff thus obtained produces on polyacrylonitrile fibres reddish-yellow dyeings or prints of a good fastness to light and to wet processing.

EXAMPLE 2

51.5 parts of diethylene triamine are added dropwise while stirring at 80° C. to a solution of 157.5 parts of o-chloro nitro benzene in 50 parts of n-butanol. The solution is heated to 130° C. to 135° C. and the temperature is maintained for about 1 hour. Subsequently, 42 parts of sodium bicarbonate are added and stirring is continued for a further 10 hours at this temperature. After addition of about 250 parts of ethanol and 50 parts of hydrochloric acid the whole is cooled, filtered with suction and washed with ethanol. 530 parts of the hydrochloride of the basic dyestuff of the formula

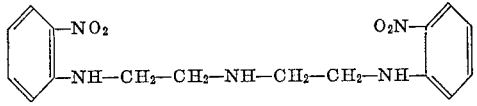

thus obtained are suspended in 600 parts of water. Then 400 parts of dimethyl sulfate and dilute aqueous sodium hydroxide solution are added while stirring at about 60° C., so that a pH value of 8 is maintained. Subsequently, the whole is heated to about 90° C. while maintaining the pH range of 7 to 7.5, until a sample is easily soluble in 5% acetic acid. After cooling, the crystal mass is filtered with suction, dissolved while hot in 10% acetic acid and clarified while hot after addition of charcoal. After cooling, the precipitated dyestuff is filtered with suction and washed with 10% aqueous sodium chloride solution.

After drying, the dyestuff is obtained, being the quaternized (methylated) basic dyestuff of the formula mentioned above, in the form of a yellow powder whose water-solubility is about 10 times as high as that of the non-quaternized color base-hydrochloride. The dyestuff thus obtained produces on polyacrylonitrile fibres reddish-yellow dyeings which are slightly more greenish than the dyeings obtained with the dyestuff produced according to Example 1, which have good fastness to light and to wet processing.

We claim:

1. A water-soluble N-(lower alkyl) quaternary dyestuff of the formula

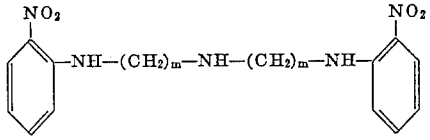

wherein $m$ is an integer of 2 to 6 and having as an anion a halide$^-$, an $SO_4^{--}/2$, a lower alkyl $—O—SO_3^-$ or a $CH_3COO^-$ group.

2. A water-soluble dyestuff according to claim 1 wherein said anion is a lower alkyl $—O—SO_3^-$ group.

3. A water-soluble dyestuff according to claim 1 wherein said anion is $—C_3H_5—O—SO_3^-$ and said N-(lower alkyl) is $—C_2H_5$.

4. A water-soluble dyestuff according to claim 1 wherein said anion is $—CH_3—O—SO_3^-$ and said N-(lower alkyl) is $—CH_3$.

References Cited

Chemical Abstracts: Volume 53, p. 6080f.
Chemical Abstracts: Volume 53, p. 7018c.
Dissectation Abstracts: Volume 18, pp. 1272–3.

CHARLES B. PARKER, *Primary Examiner.*

S. T. LAWRENCE III, *Assistant Examiner.*